Patented June 19, 1951

2,557,266

UNITED STATES PATENT OFFICE 2,557,266

REACTION PRODUCT OF AN ACRYLIC ACID RESIN AND A RESIN CONTAINING HYDROXYL GROUPS

Harry R. Dittmar, Wilmington, and Henry M. Cadot, Greenville, Del., assignors to E. I. du Pont de Nemours & Company, Wilmington, Del., a corporation of Delaware No Drawing. Application May 20, 1944, Serial No. 536,646

5 Claims. (Cl. 260—45.2)

This invention relates to resinous materials and more particularly to certain novel resin compositions having good adhesive properties. It also relates to improvements in processes for the manufacture of plywood and other like laminated articles.

It has been known heretofore, as disclosed in the Dittmar patent U. S. 2,211,689, that hot melts which are useful as adhesives may be prepared by interpolymerization of acrylic or methacrylic acids with their esters or derivatives and other polymerizable compounds, such as vinyl esters. In general the resins thus obtained have been fusible materials which have not been suitable for uses requiring a heat-resistant resin of the thermosetting type. Accordingly, it has been desirable for several years to obtain an arcylic resin adhesive which may be cured to produce a stable, heat-resistant resinous bond.

An object of this invention is to provide a process for the preparation of cured resins of the class comprising polymers of acrylic and alkacrylic acids, and interpolymers of these acids with their esters or derivatives. Another object is to prepare adhesive compositions from which plywood having excellent bond strength and good resistance to boiling water may be obtained. Other objects of the invention will appear hereinafter.

The aforesaid objects are accomplished in accordance with the invention by treating an acrylic resin of the class consisting of polymers and interpolymers of compounds of the formula

$$CH_2=C(R)COOH$$

(R being hydrogen or an alkyl group) with a resin containing a plurality of hydroxyl groups. In a specific embodiment, the invention contemplates a cured adhesive composition which may be obtained by condensing methyl methacrylate-methacrylic acid interpolymers with partially hydroylzed polyvinyl acetate.

In one method of practicing this invention, the acrylic resin is admixed, preferably in the presence of a solvent, with a resin containing a plurality of hydroxyl groups, and the resulting mixture is applied to an article which is to be adhesively bonded. The bonding is thereafter completed by heating the article, suitably in a hot press.

The acrylic resins which may be used in accordance with this invention include the acrylic acid and alkacrylic acid polymers, and the interpolymers of acrylic and alkacrylic acids with alkyl acrylates and alkyl alkacrylates. Outstanding among these acrylic resins are interpolymers of methyl methacrylate-methacrylic acid, ethyl methacrylate-methacrylic acid, butyl methacrylate (including n-butyl and isobutyl)-methacrylic acid, isobutyl methacrylate-acrylic acid, and other similar interpolymers containing free carboxyl groups. The polyacrylic and polyalkacrylic acid themselves may be used, but the resultant adhesives are generally inferior to the adhesives obtained through the use of the interpolymers. The preferred interpolymers contain about 25% to 85% by weight of acrylic or alkacrylic ester, the remainder being the acrylic or alkacrylic acid component. These acrylic resins may be prepared by partial hydrolysis of polymeric alkyl acrylates or alkacrylates, but this method is quite tedious, and therefore these resins are preferably prepared by interpolymerization of the appropriate monomers.

The resins containing a plurality of hydroxyl groups include the hydrolyzed vinyl ester polymers, such as partially hydrolyzed polyvinyl acetate, partially hydrolyzed polyvinyl formate, hydrolyzed or partially hydrolyzed olefin-vinyl ester interpolymers, polyvinyl alcohol, and resins containing a plurality of N-methylol groups, such as N-methylol polyamides. Included also are the ethylene-formaldehyde interpolymers disclosed in the copending application of E. H. Hanford, S. N. 449,779, filed July 4, 1942, now Patent Number 2,373,561, April 10, 1945. The preferred resins containing a plurality of hydroxyl groups are the hydrolyzed (i. e., saponified) vinyl ester polymers in which the hydrolysis is 40 to 60% complete, and the 40 to 100% hydrolyzed ethylene-vinyl acetate interpolymers having an ethylene:vinyl acetate ratio not exceeding about 3:1. The hydrolyzed ethylene-vinyl acetate interpolymers are disclosed in the Roland application S. N. 446,114, filed June 8, 1942, now abandoned.

The relative amounts of the acrylic resin and the resin containing a plurality of hydroxyl groups may vary widely, but best results are obtained when the number of equivalents of free hydroxyl in the mixture is about equal to the number of equivalents of free carboxyl. Thus the preferred adhesive resin mixtures contain about 0.8 to 1.2 equivalents of hydroxyl per equivalent of carboxyl.

Any suitable solvent may be employed in the adhesive compositions of the present invention. It is desirable, however, to employ solvents which are readily vaporized prior to or during curing, such as mixtures containing methanol-water, ethanol-water, benzene-methanol, isobutanolwater, dioxane-water, and the like Acid-reacting catalysts may be present in the adhesive compositions, but these catalysts are generally unnecessary.

In addition to the aforesaid acrylic resins, and resins containing a plurality of hydroxyl groups, the adhesive compositions may contain other resins or resin ingredients, especially formaldehyde-amidogen condensation products, such as dimethylol urea, N-methylol polyamides, N-methylol diglycollic diamides, N-methylol methoxyacetamide, N-methylol hydroxyacetamide, N-methylol melamine or mixtures of these amidogen-formaldehyde condensation products. Other suitable resins which may be present in the adhesive compositions include phenol-formaldehyde condensation products, casein-formaldehyde condensation products, and soluble thermoplastic resins such as glycol polyformals, polydioxolane, ethylene oxide polymers, and the like. It is to be understood that the invention does not include the vinyl ester-acrylic resin interpolymers, or derivatives thereof, which are quite different from the compositions herein disclosed.

The adhesive compositions described herein may be applied to the wood, metal, glass, cork, paper, abrasive grain, or other article to be bonded by any convenient method of application, such as brushing, spraying, dipping, or interposing the solid resin as a powder or film between layers to be united. The article to be adhesively bonded is thereafter preferably subjected to heat and pressure, whereby a cured resin bond is produced. The bond contains a resinous condensation product derived from the carboxyl-containing acrylic resin and the resin having a plurality of hydroxyl groups. This condensation product is characterized by its resistance to moisture and its good adhesive properties. The curing temperature is generally within the range of about 110° to 180° C., preferably about 150° to 170° C. Suitable curing pressures are in the range from atmospheric pressure to about 500 pounds per square inch.

The invention is further illustrated by means of the following examples.

*Example 1.*—A mixture containing 20 parts by weight of an interpolymer of methacrylic acid and n-butyl methacrylate (45% methacrylic acid, 55% n-butyl methacrylate by weight), 13.6 parts of partially hydrolyzed polyvinyl acetate (50% hydrolysis), 13.6 parts of water, and 120.8 parts of 95% ethanol is heated at the boiling point for two hours with continuous stirring, whereby a colorless, homogeous, viscous fluid is obtained. Birch 3-ply plywood bonded with this adhesive by pressing for 15 minutes at 160° to 170° C., and under a pressure of 312 pounds per square inch, had a shear strength of 550 pounds per square inch when tested dry, and 400 pounds per square inch after soaking for three hours in boiling water (test described in Army-Navy specification AN-NN-P-511b).

*Example 2.*—A mixture containing 20 parts of an interpolymer of methacrylic acid and n-butyl methacrylate (45% methacrylic acid, 55% n-butyl methacrylate), 6.8 parts of partially hydrolyzed polyvinyl acetate (50% hydrolysis), 6.9 parts of water and 100.4 parts of 95% ethanol was prepared as described in Example 1. Birch 3-ply plywood bonded with this adhesive by heating for 15 minutes at 160° to 170° C., under 312 pounds per square inch pressure, had a dry shear strength of 470 pounds per square inch and a shear strength of 390 pounds per square inch after soaking for three hours in boiling water.

*Example 3.*—The following table records the results obtained in bonding birch plywood (3-ply, panel thickness 0.185 inch) with adhesives containing methacrylic acid interpolymers, under the stated conditions. In these tests, the adhesive solution was applied to four faces of the wood to be bonded, and the solvent was allowed to evaporate prior to bonding.

*Plywood shear strength tests*

| Composition and Preparation of the Adhesive | Per Cent Solids (as Applied) | Bonding Catalyst | Weight Solids, lbs. per 1,000 sq. ft. Glue Line | Bonding Conditions | | | Shear Strength (AN-NN-P-511b) lbs./sq. in. | |
|---|---|---|---|---|---|---|---|---|
| | | | | Press., lbs. sq. in. | Temp., °C. | Time, Min. | Dry | Wet |
| (a) 61.4% interpolymer containing 45% methacrylic acid and 55% n-butyl methacrylate; 38.6% dimethylol urea (87% strength); solvent 95% (by wt.) ethanol, 5% water. Refluxed 15 min. | 28.5 | HCl to a pH of 4 | 36 | 312 | 160–170 | 15 | 445 | 320 |
| (b) 61.5% interpolymer containing 45% methacrylic acid and 55% n-butyl methacrylate; 38.5% hydrolyzed ethylene-vinyl acetate interpolymer (ethylene: vinyl acetate ratio=3, intrinsic viscosity=1.07). Ratio COOH:OH=1:1. Solvent: 74% benzene—26% methanol. Refluxed 3 hrs. at atmospheric pressure. | 20 | None | 36 | 312 | 160–170 | 15 | 490 | 310 |
| (c) 68.7% interpolymer containing 8% methacrylic acid and 92% n-butyl methacrylate; 31.3% ethylene-formaldehyde interpolymer (ethylene:HCHO ratio—16.4:1, intrinsic viscosity=0.37). Ratio COOH:OH=1:1. Solvent=benzene-ethanol. | 20 | 0.3% p-toluene sulfonic acid, based on weight of adhesive solids. | 36 | 316 | 160–170 | 15 | 380 | 320 |
| (d) 25% N-methylol hexamethylene polyadipamide (45–50% amide substitution); 44.7% interpolymer containing 45% methacrylate acid and 55% n-butyl methacrylate; 30.3% partially hydrolyzed polyvinyl acetate (50% hydrolysis). Solvent: 80% ethanol-20% water. Refluxed solution of methacrylic interpolymer and hydrolyzed vinyl acetate for 2 hrs., then added the N-methylol polyamide (35% solution) at 60° C. The pH of the mixture was 10.2. | 45 | None | 25 | 200 | 120–130 | 20 | 585 | 475 |

The ingredients and proportions of ingredients set forth in the above specification and examples may vary widely without departing from the scope of the present invention. The compositions containing the acrylic acid or alkacrylic acid interpolymers admixed with the resins containing a plurality of hydroxyl groups may be employed for various purposes which will readily occur to those skilled in the art. For example these thermosetting resin mixtures have applications not only in the field of adhesives, but also in the manufacture of coating compositions, foils, filaments, molded products, impregnating agents, water-proofing compositions, water-soluble paints, textile sizes, electrical insulating materials, and other similar uses.

Although this invention has been illustrated with reference to certain specific examples and embodiments, we do not intend to limit ourselves thereby, since the invention may be otherwise embodied and practiced within the scope of the appended claims.

We claim:

1. A resinous composition comprising a thermally cured condensation product of a mixed resin consisting essentially of (1) an interpolymer of a compound of the formula $CH_2=C(R)COOH$ with a compound of the formula $CH_2=C(R)COOR'$, said interpolymer containing 25% to 85% by weight of the compound of the formula $CH_2=C(R)COOR'$, R being a member of the class consisting of hydrogen and methyl groups, R' being an alkyl group containing from 2 to 4 carbon atoms, admixed with (2) a linear polymer containing a plurality of alcoholic hydroxyl groups, said mixed resins containing 0.8 to 1.2 equivalents of alcoholic hydroxyl per equivalent of carboxyl, said condensation product being characterized by its good adhesive properties and its resistance to hot water when employed as a plywood adhesive bond, said linear polymer containing a plurality of alcoholic hydroxyl groups comprising a member of the class consisting of ethylene-formaldehyde interpolymers, hydrolyzed polyvinyl esters, and hydrolyzed ethylene-vinyl ester interpolymers.

2. A resinous composition comprising a thermally cured condensation product of a mixed resin consisting essentially of (1) an interpolymer of a compound of the formula $$CH_2=C(R)COOH$$

with a compound of the formula $$CH_2=C(R)COO\text{-n-butyl}$$

said interpolymer containing 25% to 85% by weight of the compound of the formula $CH_2=C(R)COO\text{-n-butyl}$, R being a member of the class consisting of hydrogen and methyl groups, admixed with (2), a linear polymer containing a plurality of alcoholic hydroxyl groups, said mixed resins containing 0.8 to 1.2 equivalents of alcoholic hydroxyl per equivalent of carboxyl, said condensation product being characterized by its good adhesive properties and resistance to hot water when employed as a plywood adhesive bond, said linear polymer containing a plurality of alcoholic hydroxyl groups comprising a member of the class consisting of ethylene-formaldehyde interpolymers, hydrolyzed polyvinyl esters, and hydrolyzed ethylenevinyl ester interpolymers.

3. The composition set forth in claim 2 in which the said linear polymer containing a plurality of alcoholic hydroxyl groups is a hydrolyzed ethylene-vinyl acetate interpolymer.

4. The composition set forth in claim 2 in which the component containing a plurality of alcoholic hydroxyl groups is a mixture of partially hydrolyzed polyvinyl ester and an N-methylol polyamide.

5. The composition set forth in claim 2 in which the said linear polymer containing a plurality of alcoholic hydroxyl groups is an ethylene-formaldehyde interpolymer.

HARRY R. DITTMAR.
HENRY M. CADOT.

REFERENCES CITED

The following references are of record in the file of this patent:

UNITED STATES PATENTS

| Number | Name | Date |
|---|---|---|
| 2,047,398 | Voss et al. | July 14, 1936 |
| 2,067,706 | Fikentscher | Jan. 12, 1937 |
| 2,138,763 | Graves | Nov. 29, 1938 |
| 2,150,697 | Nevin | Mar. 14, 1939 |
| 2,169,250 | Izard (1) | Aug. 15, 1939 |
| 2,193,941 | Seebach | Mar. 19, 1940 |
| 2,200,429 | Perrin et al. | May 14, 1940 |
| 2,239,718 | Izard (2) | Apr. 29, 1941 |
| 2,244,702 | Hubbuch (1) | June 10, 1941 |
| 2,244,703 | Hubbuch (2) | June 10, 1941 |
| 2,326,078 | Trommsdorff | Aug. 3, 1943 |
| 2,386,347 | Roland | Oct. 9, 1945 |
| 2,419,880 | Blyler et al. | Apr. 29, 1947 |

FOREIGN PATENTS

| Number | Country | Date |
|---|---|---|
| 487,056 | Great Britain | June 14, 1938 |